(12) United States Patent
Galka et al.

(10) Patent No.: US 6,427,647 B1
(45) Date of Patent: Aug. 6, 2002

(54) INTERNAL COMBUSTION ENGINES

(75) Inventors: William E. Galka, Caro; Ronald H. Roche, Cass City, both of MI (US)

(73) Assignee: Walbro Corporation, Cass City, MI (US)

( * ) Notice: Subject to any disclaimer, the term of this patent is extended or adjusted under 35 U.S.C. 154(b) by 0 days.

(21) Appl. No.: 09/975,726

(22) Filed: Oct. 11, 2001

Related U.S. Application Data

(63) Continuation of application No. 09/764,701, filed on Jan. 18, 2001.
(60) Provisional application No. 60/178,429, filed on Jan. 27, 2000.

(51) Int. Cl.$^7$ ................................................ F02B 33/04
(52) U.S. Cl. .................................. 123/73 B; 123/73 PP
(58) Field of Search ........................... 123/73 B, 73 R, 123/73 A, 65 R, 73 PP

(56) References Cited

U.S. PATENT DOCUMENTS

| | | | | |
|---|---|---|---|---|
| 4,469,054 A | * | 9/1984 | Onishi et al. | 123/73 R |
| 4,625,688 A | * | 12/1986 | Takayasu | 123/73 B |
| 5,031,590 A | * | 7/1991 | Sakurai | 123/73 R |
| 5,586,525 A | * | 12/1996 | Masse | 123/73 B |
| 6,079,379 A | * | 6/2000 | Cobb, Jr. | 123/73 B |
| 6,273,037 B1 | * | 8/2001 | Cobb, Jr. | 123/73 B |
| 6,293,235 B1 | * | 9/2001 | Cobb, Jr. | 123/73 B |
| 6,295,957 B1 | * | 10/2001 | Cobb, Jr. | 123/73 B |

OTHER PUBLICATIONS

John Deere Consumer Products—Two–Stroke Engine Technology Overview—Feb. 1999, pp. 1–7.
Deere Technology Breakthrough Reduces Small Engine Emissions, John Deere Website Feb. 4, 1999, pp. 1–2.
Basic Design of Two–Stroke Engines, Gordon P. Blair, Chapter 7, p. 333.

* cited by examiner

*Primary Examiner*—Carl S. Miller
*Assistant Examiner*—Jason Benton
(74) *Attorney, Agent, or Firm*—Reising, Ethington, Barnes, Kisselle, Learman & McCulloch, P.C.

(57) ABSTRACT

A two stroke combustion engine, equipped with fuel injection apparatus and ignition timing controlled by throttle position, has a charge forming device which delivers a rich fuel mixture from an integral float-type fuel chamber. The fuel injection apparatus typically comprises a tuned injector tube that communicates between a crankcase injector port and a cylinder injector port. The vast majority of fuel mixes with air in an injector mixing passage of the charge forming device where it is subsequently delivered to the tuned injector tube which directly injects the rich fuel mixture into a cylinder of the engine. The rich fuel mixture supplied by the charge forming device injects into the combustion chamber through the cylinder injector port via a reflected pressure wave generated from the previous combustion cycle. A primary air circuit of the charge forming device delivers a substantially lean mixture of fuel-and-air into the crankcase at high engine speeds where it flows from the crankcase through an air feed passage and into the combustion chamber. At idle and low speed engine conditions where throttle position is less than fifty percent open, ignition timing is predominately used to control engine operation. This feature simplifies design and calibration of the charge forming device while improving engine performance at extremely low fuel demands and load conditions.

28 Claims, 4 Drawing Sheets

INTERNAL COMBUSTION ENGINES

REFERENCE TO COPENDING APPLICATION

This application is a continuation of U.S. Ser. No. 09/764,701 filed on Jan. 18, 2001 and provisional application U. S. Ser. No. 60/178,429 filed on Jan. 27, 2000.

FIELD OF THE INVENTION

This invention relates to an internal combustion engine, and more particularly to a two cycle internal combustion engine having a fuel injection system.

BACKGROUND OF THE INVENTION

Carburetors have commonly been used to supply a fuel-and-air mixture to both four stroke and two stroke internal combustion engines. Hand held yard tools, such as chainsaws and weed trimmers, use small two stroke engines having carburetors with a diaphragm fuel delivery pump and a diaphragm fuel metering system. For larger fuel demand two stroke engine applications which experience little change in engine orientation during operation, float-type carburetors are commonly utilized. Such large applications include outboard marine motors, snowmobiles and other recreational vehicles; In operation, large two stroke outboard marine engines, and large engines of other recreational vehicles have an engine cylinder displacement of at least fifty cubic centimeters, CC, per cylinder, and typically utilize a float-type carburetor. Large two stroke engines with float-type carburetors have a high level of hydrocarbon exhaust emissions which are detrimental to the environment and exceed the exhaust emission requirements imposed by the state of California and the emission requirements proposed by the Environmental Protection Agency of the United States Government and the Governments of several other countries.

For marine two stroke engine applications, such as outboard motors, ignition timing is varied widely as compared to carburetor throttle opening, and in fact, most engine revolutions per minute, RPM, change is achieved from idle speed to approximately fit percent of maximum engine RPM by ignition timing. To change ignition timing with throttle opening, the marine industry has typically used throttle ignition linkage mechanisms to advance ignition timing in advance of the beginning and full opening of the carburetor throttle. This ignition timing curve verse engine RPM verse throttle opening is duplicated electronically in fuel injection systems.

Previous marine fuel injection system technology, utilized fuel systems sized appropriately for fuel delivery between idle and wide open throttle conditions with the injector fuel flow typically synchronized with the engine throttle air valve. Because smaller two stroke engines are equipped with fixed ignition and port timing restraints, they often produce higher engine emissions on a per unit or CC displacement basis, and have additional fuel system calibration challenges. Often there is; cycle-to-cycle variation in fuel charge delivery from decreased injection system air flow (fuel pooling and wetting in the delivery manifold), insufficient dwell time inside the engine cylinder for fuel charge mixing and preparation, dilution of the incoming fuel charge in the cylinder with exhaust gas residue from insufficient scavenging at low speeds, and variation in cycle-to-cycle cylinder mean effective pressure from these factors resulting in unstable engine RPM.

SUMMARY OF THE INVENTION

A fuel injection system, for a large two-stroke engine with a displacement of at least fifty cubic centimeters per cylinder, injects a rich fuel and air mixture directly into each cylinder of the engine. The fuel injection system has a charge forming device which supplies a rich fuel-and-air mixture to a tuned injector tube for each cylinder connected adjacent one end through a port or valve to the cylinder and adjacent the other end to the engine crankcase. The charge forming device has an injector air inlet and fuel mixing passage to which, fuel is supplied by a primary fuel circuit under all engine operating conditions, while a separate inlet air flow passage supplies primary air to the crankcase of the engine. From the crankcase, the primary air is transferred to each cylinder usually through a transfer passage and/or inlet port or valve. Under engine wide open throttle conditions, a very minor quantity of fuel (with a lubricant such as oil therein) may be supplied through the engine inlet air flow passage to the crankcase and transferred to each cylinder to provide lubricant of the moving parts in the crankcase and some cooling of the engine. Fuel is supplied to the primary and crankcase circuits from a float bowl type common fuel chamber. Preferably, fuel is supplied to the fuel chamber from a fuel tank by gravity or by a low pressure fuel pump which may be a diaphragm type fuel pump actuated either mechanically or by pressure pulses from the engine crankcase or the engine inlet air flow passage.

Preferably, the primary air flow passage has a throttle valve. The separate fuel injector mixing passage is configured to provide a fuel flow rate therethrough proportional or correlating to the air flow through the primary air passage as controlled by the extent of the opening of the throttle valve. Moreover, the engine ignition timing is advanced in conjunction with and/or in advance of opening of the throttle valve to increase engine RPM. The ignition timing may be mechanically or electronically advanced and retarded in proportion to and in response to the extent of opening and closing of the throttle valve. However, for some engine applications, the fuel injector mixing passage and the engine primary air flow passage may each have separate throttle valves operably connected together to control in unison and provide proportional air flow through their separate passages. Preferably, both the fuel injector mixing passage and the engine primary air flow passage each have choke valves which are operably connected together so that they can be closed and opened in unison and provide proportional air flow through their passages for cold start fuel enrichment of the engine.

Objects, features and advantages of this invention include providing an arrangement of a mechanical fuel injection system for a large two stroke engine and a fuel charging device which provides a significant decrease in engine hydrocarbon exhaust emissions, significantly improved fuel economy, variable ignition timing used to enhance idle/slow speed stability, improved combustion stability, synchronized simultaneous throttling of both the engine inlet air flow and the fuel injector inlet air flow, synchronized simultaneous choking for cold starting of both the engine inlet primary air flow and the fuel injector inlet air flow, improved engine cold starting and warm-up, improved operating stability of the charge forming device, an extremely compact construction and arrangement, a relatively simple design, extremely low cost when mass produced, and which is rugged, durable, reliable, requires little maintenance and adjustment in use, and in service has a long useful life.

DESCRIPTION OF THE DRAWINGS

These and other objects, features and advantages of this invention will be apparent from the following detailed description, appended claims, and accompanying drawings in which:

DETAILED DESCRIPTION OF THE PREFERRED EMBODIMENT

Figure 1:
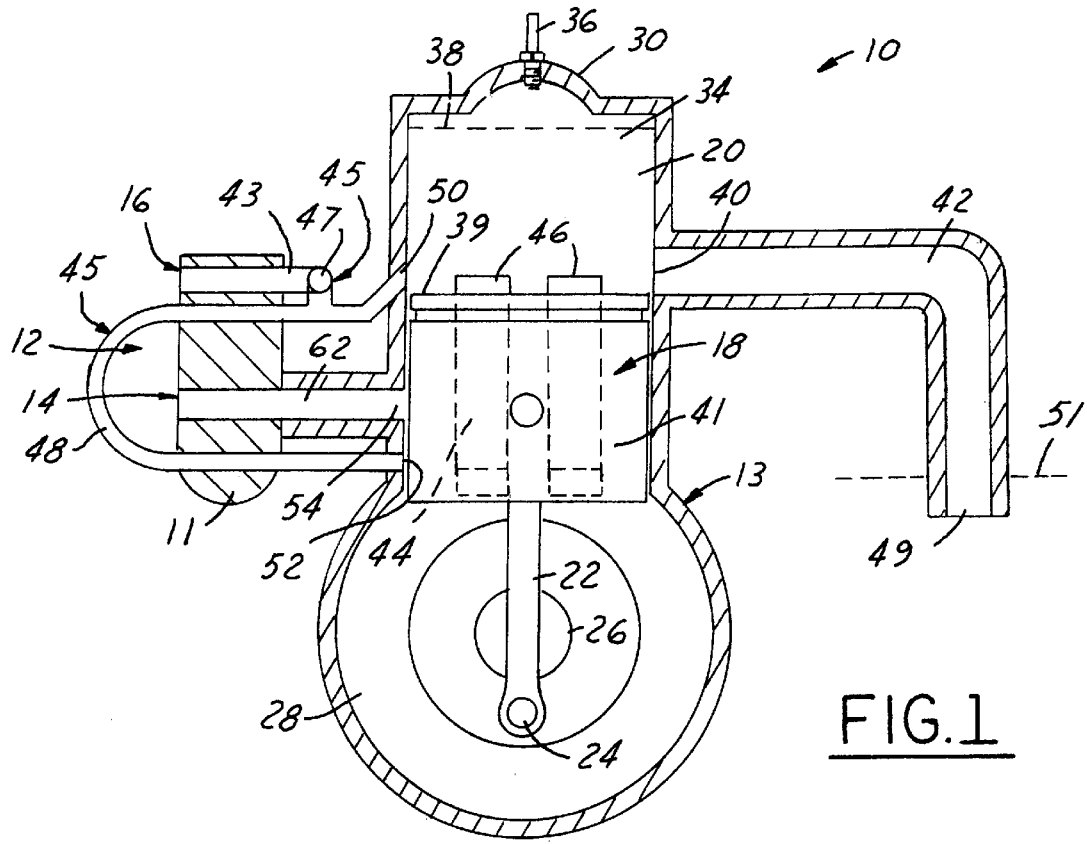
FIG. 1 is a cross section side view of a two cycle combustion engine with a fuel injection system of the present invention.
Figure 2:
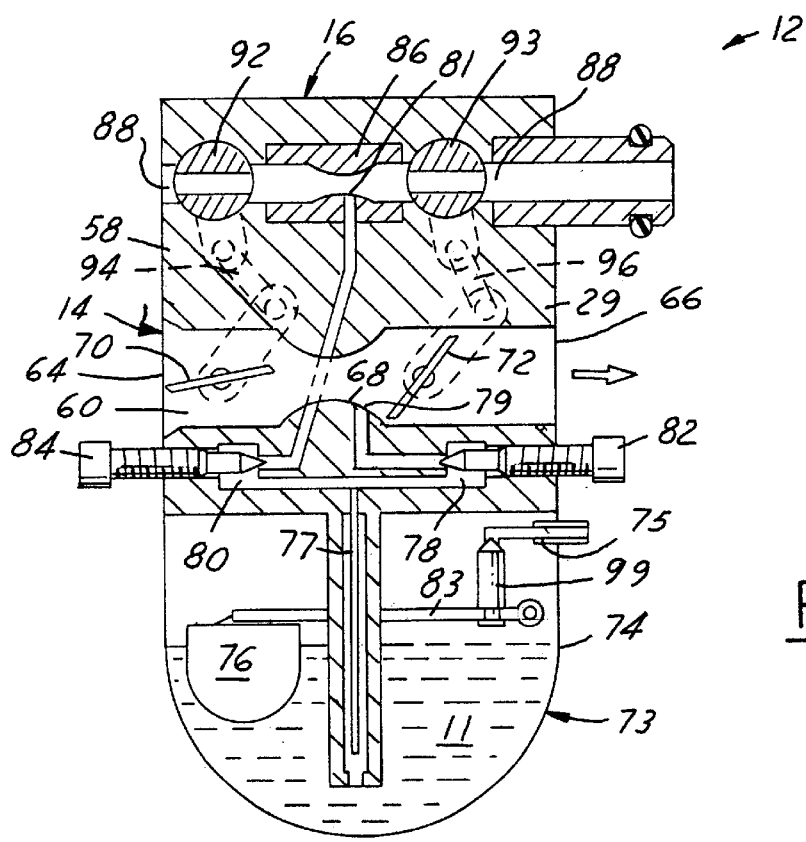
FIG. 2 is a cross sectional side view of a charge forming device with a float-type fuel chamber of the fuel injection system of FIG. 1.

Referring in more detail to the drawings, FIG. 1 illustrates a large two cycle combustion engine 10 embodying this invention. Engine 10 is preferably of a high fuel demand engine for a marine application and has a charge forming device 12 having an integral float-type fuel chamber 11 from which it draws high volumes of fuel as best shown in FIG. 2. The charge forming device 12 also has a primary air circuit 14 for delivering the majority of air to engine 10, and a primary fuel circuit 16 for delivering an enriched fuel-and-air mixture to engine 10. Typically, engine 10 is powered by a hydro-carbon liquid fuel such as gasoline which is usually supplied as a mixture of gasoline and lubrication oil typically in a 50:1 ratio by volume. The two stroke combustion engine 10 has at least one engine block subassembly 13, each one having a piston 18 received for reciprocation in a cylinder 20 and connected by a rod 22 to a throw 24 of a crank shaft 26 journalled by bearings for rotation in a crankcase 28. The piston 18 and cylinder 20, in cooperation with a cylinder head 30, define a combustion chamber 34 of each subassembly 13 in which the fuel-and-air mixture is compressed and ignited by a spark plug 36 to cause the piston 18 to rotate the crank shaft 26 in operation of the engine 10. Supplying the vast majority of total fuel flow into the combustion chamber 34 is the primary fuel circuit 16 of the charge forming device 12. Any remaining amount of total fuel flow, essentially existing only at wide open throttle, (WOT) conditions, is supplied to the crankcase 28 by the primary air circuit 14 of the charge forming device 12, for lubrication of moving parts in the crankcase 28 and for cooling purposes.

Although not required, for simplicity of assembly, the float-type fuel chamber 11, the primary air circuit 14 and the primary fuel circuit 16 of the charge forming device 12 are defined and supported by a common body 58, as best shown in FIG. 2. The fuel circuit 16 is preferably disposed above the primary air circuit 14, and the float-type fuel chamber 11 is disposed below the primary air circuit 14.

The enriched mixture of fuel-and-air flows from the primary fuel circuit 16, where it is then distributed to a separate injector circuit 45 which communicates respectively with one combustion chamber 34 and crankcase 28 of each engine block subassembly 13. Each injector circuit 45 has a tuned injector tube 48 which communicates with the primary fuel circuit 16 through a feed tube 43 which extends between them. The tuned injector tube 48 preferably is substantially U-shaped and communicates with the combustion chamber 34 through a cylinder injector port 50 at its upper end, and with the crankcase 28 through a crankcase injector port 52 at its opposite lower end. The injector feed tube 43 intermittently delivers the enriched mixture of fuel-and-air from the primary fuel circuit 16, through a check valve 47, to the tuned injector tube 48 substantially near the cylinder injector port 50. The check valve 47 prevents reverse flow through the primary fuel circuit 16 by isolating the injector feed tube 43 from the tuned injector tube 48. Each one of the check valves 47 is disposed within each respective one of the injector feed tubes 43 preferably substantially near the tuned injector tube 48.

As shown in FIG. 2, the body 58 defines a primary air mixing passage 60 of the primary air circuit 14 having an inlet 64 exposed to atmosphere and an outlet 66 which communicates with a primary air feed pipe 62, as best shown in FIG. 1. The air feed pipe 62 is disposed between the body 58 of the charge forming device 12 and the crankcase 28 of the engine block subassembly 13. Exiting air from the primary air circuit 14 thereby flows through the outlet 66 of the primary air mixing passage 60, through the feed pipe 62, and into the crankcase 28 via a primary air intake port 54. A venturi 68 is positioned within the mixing passage 60, with a choke valve 70 disposed operatively between the inlet 64 and the venturi 68 and a throttle valve 72 disposed operatively between the venturi 68 and the outlet 66.

Typically located beneath the air mixing passage 60 of the primary air circuit 14 is a fuel supply device 73 having fuel bowl 74 which defines the fuel chamber 11. The fuel level within bowl 74 is controlled by a float mechanism 76 with a fuel inlet 75 and a control valve 99 which is moved to opened and closed positions by the float 76 through a pivoted lever arm 83 in response to changes in the level of fuel in the bowl 74. Fuel is drawn upward from the fuel bowl 74 through a fuel passage 77 having a first leg 78 which feeds small amounts of fuel through a feed port 79 into the primary air mixing passage 60 at wide-open-throttle, WOT, conditions, and a second leg 80 which feeds the bulk of the fuel through an injector venturi port 81 into an injector mixing passage 88 of the primary fuel circuit 16. The feed port 79 of the first leg 78 communicates with the primary air mixing passage 60 substantially near the venturi 68. A fuel bleed screw 82 is rotateably positioned obstructively within the first leg 78 of the fuel passage 77 to control the small amount of fuel flow to the feed port 79 at WOT conditions. Exiting fuel from the feed port 79 mixes with air flowing through the primary air mixing passage 60 and enters the crankcase 28. As previously discussed, the fuel is preferably a mixture of gasoline and oil. The oil portion of the fuel exiting feed port 79 primarily serves to lubricate the moving parts within the crankcase 28 of the engine 10, but also aids in cooling of the reciprocating engine components, and the gasoline portion assists combustion stability at high speeds by improving fuel dispersion within the combustion chamber 34.

Optionally, if a pressurized oil injection system (not shown) is utilized in the two stroke engine of the present invention, then oil is not pre-mixed within the fuel. Under such circumstances, the first leg 78, the fuel bleed screw 82, and the feed port 79 is not required. All of the oil-less fuel is then fed through the second leg 80 of the fuel passage 77 into the injector mixing passage 88 of the primary fuel circuit 16.

Intersecting the second leg 80 of the fuel passage 77 is a fuel adjustment screw 84 of the primary fuel circuit 16 which controls fuel flow to the injector venturi port 81. Port 81 is positioned within a venturi or nozzle 86 disposed within the injector mixing passage 88 of the primary fuel circuit 16. The vast majority of fuel supplied to the combustion chamber 34 flows through the injector venturi port 81 into the injector passage 88. Air flows through the injector passage 88 and mixes with the fuel supplied through the injector venturi port 81, forming a rich fuel-and-air mixture which then flows into the connecting injector feed tube 43, as previously described and best shown in FIG. 1.

An injector choke valve 92 limits air flow through the injector mixing passage 88 during cold start conditions, and is positioned between the atmospheric inlet end of the injector mixing passage 88 and the venturi 86. Depending upon the operating dynamics of the particular combustion engine 10, an injector throttle valve 93 can be operatively positioned between the venturi 86 and an outlet of the injector mixing passage 88. The optional throttle valve 93 will be described in detail below. The injector choke and throttle valves 92, 93 are preferably rotary type valves which traverse the injector mixing passage 88 along parallel axes of rotation.

The injector choke valve 92 and the primary air choke valve 70 close and open in unison. As illustrated in phantom in FIG. 2, the choke valve 70 is mechanically linked to the choke valve 92 by a series of pivoting arms and links 94. Likewise, the primary air throttle valve 72 is mechanically linked to the optional injector throttle valve 93 by a series of pivoting arms and links 96. Although the valves 70, 72 are shown as conventional plates, which pivot or rotate about their own respective shafts, the valves may also be constructed as described in copending patent application, Ser. No. 09/764,701, incorporated herein by reference. This alternate configuration, where the choke valves share a common shaft and the throttle valves share another common shaft, will eliminate the need for pivoting arms, and links 94 and 96 as shown in FIG. 2.

The reciprocation of the piston 18 extends or moves from a top dead center position, TDC 38, to a bottom dead center position, BDC 39, as best shown in FIG. 1. Referring to FIG. 1, a circumferential skirt 41 of the reciprocating piston 18 unveils and covers-up or opens and closes a variety of ports communicating with either the cylinder 20 or the crankcase 28, enabling specific events at prescribed times during the piston or engine cycle. One such port located in the cylinder 20 is an exhaust port 40 of each engine block subassembly 13 which communicates with a common connecting exhaust pipe 42. Another port disposed in the cylinder 20 is the injector port 50 which is preferably diametricly opposed to the exhaust port 40 and has an upper edge located slightly further away from TDC 38 than an upper edge of the exhaust port 40. For marine applications, pipe 42 has an outlet 49 which often communicates below the surface 51 of the surrounding body of water. For instance, if the boat hull is on-plane, the engine is running at high speeds and the outlet 49 is usually out or nearly out of the water. However, when the engine runs at idle, the boat hull sits low in the water and the exhaust outlet 49 is substantially below the water surface.

At idle, the combustion chamber 34 is therefore exposed to back pressure conditions. The exhaust gases pass from the combustion chamber 34 through the pipe 42 and outlet 49 when the exhaust port 40 is opened by the downward stroke of the piston 18 from TDC 38 to BDC 39. During the downward stroke, intake air is supplied to the combustion chamber 34 from the crankcase 28 via air transfer passages 44 and corresponding transfer ports 46 communicating with the cylinder 20, when ports 46 are opened by the piston 18 or skirt 41 near BDC 39. Typically the upper edge of each transfer port 46 is located below the upper edge of the exhaust port 40 and injector port 50. The influx of intake air aids in each transfer port 46 expelling the combustion gases contained in cylinder 20 through the exhaust port 40.

Engine Operation

In operation, the crankcase 28 is under sub-atmospheric pressure when piston 18 moves upward during its compression stroke. Prior to reaching TDC 38, the crankcase injector tube port 52 is unveiled by the piston skirt 41 exposing the lower end of the tuned injector tube 48 to the sub-atmospheric pressure of the crankcase 28. With the tuned injector tube 48 under sub-atmospheric pressure, the check valve 47 opens allowing a rich mixture of fuel-and-air to flow from the primary fuel circuit 16 through the injector feed tube 43 and into the upper portion of the tuned injector tube 48 near the cylinder injector port 50. As the piston 18 continues to move upward, a primary air intake port 54 is exposed from beneath the skirt 41 of the piston 18 allowing air (or at WOT a very lean mixture of fuel-and-air) to be drawn into the crank case 28 from the primary air circuit 14 of the charge forming device 12.

As the piston 18 reaches near the TDC 38, the compressed fuel and air mixture within the combustion chamber 34 is ignited by the spark plug 36. The expansion of the ignited gases forces the piston 18 to move downward toward BDC 39. During this downward stroke, the engine is delivering power through the rod 22 and throw 24, to rotate the crank shaft 26. After the piston skirt 41 closes the primary air intake port 54 during the downward stroke, the crankcase 28 becomes pressurized. The tuned injector tube 48 becomes partially pressurized because it is still exposed to the pressurized crankcase 28 through the crankcase injector port 52.

As the piston 18 continues its downward stroke and closes the crankcase injector port 52 and hence the lower end of the tuned injector tube 48 from the crankcase 28, the previously inducted charge of the rich fuel-and-air mixture is substantially left resident in the tube. The exhaust port 40 near BDC 39 opens and exhaust gases begin to escape through the exhaust pipe 42. Soon after opening of the exhaust port 40, but immediately before transfer ports 46 are uncovered by the piston 18, fresh air begins to enter the chamber 34, the injector intake port 50 is uncovered by the piston 18 and the expansion pressure of combustion gases in the cylinder 20 generates a pressure pulse wave which is introduced into and travels down the tuned injector tube 48, and is reflected back toward the still open intake port 50 to provide a reflected pneumatic pressure pulse which carries the previously induced charge of the rich fuel-and-air mixture from the tuned injector tube 48 into the combustion chamber 34 (which is near atmospheric pressure due to the exhaust port 40 being recently opened) through the open injector port 50.

Also on the downward stroke of the piston 18, and depending upon the engine application, the fuel-and-air mixture is substantially left resident in the upper portion of the tuned injector tube 48, but the heavier ends or oil portion of the fuel is substantially left resident in the lower portion of the tube.

On the return stroke of piston 18 as it moves toward TDC 38, the piston covers and closes the injector intake port 50 and compresses the fuel-and-air mixture in the combustion chamber 34 for the next combustion event and opens the crankcase injector port 52 for communication of the lower end of the tuned injector tube 48 with the sub-atmospheric crankcase pressure to repeat the fuel induction and subsequent injection cycle. The tuned injector tube 48 is of sufficient length and diameter that the fuel-and-air mixture charge inducted in the upper portion of the tube 48 at high engine speeds does not flow into the engine crankcase 28 while port 52 is open. However, at idle and low engine speeds, heavier ends or oils of the fuel left resident in the lower portion of the tube 48 adjacent to port 52, and from previous cycles, will expel through port 52 providing lubrication for the reciprocating engine components within the crankcase. Ideally, enough oil is expelled at idle and low engine speeds through port 52 so that the first leg 78, the fuel bleed screw 82, feed port 79 and possibly the alternative pressurized oil injection system are not required.

As noted briefly above, after the combustion event and as the piston 18 moves toward BDC 39 and after opening, the exhaust port 40, the piston 18 also opens the transfer ports 46 to transfer compressed air from the crankcase 28 into the cylinder 20, to scavenge and aid in removing the exhaust gasses, provide fresh air for the subsequent combustion event, and to remain in the combustion chamber 34 and preferably provide homogenous dispersion of the rich fuel-and-air mixture discharge from the open intake port 50.

Figure 3:
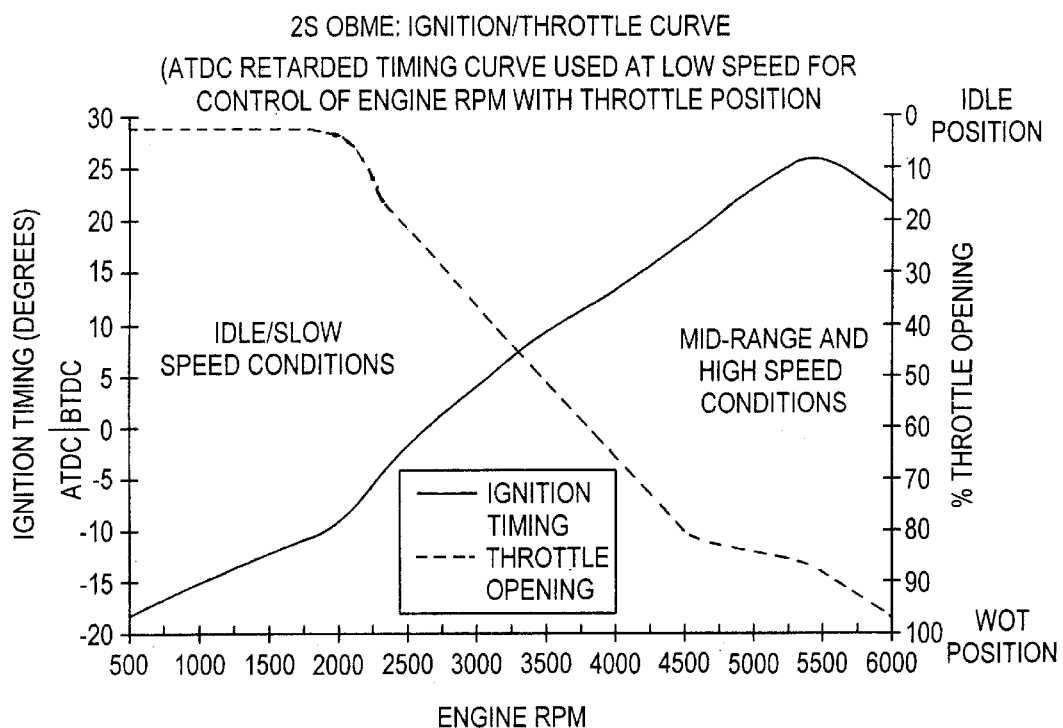
FIG. 3 is an engine ignition timing and throttle opening curve graph.
Figure 7:
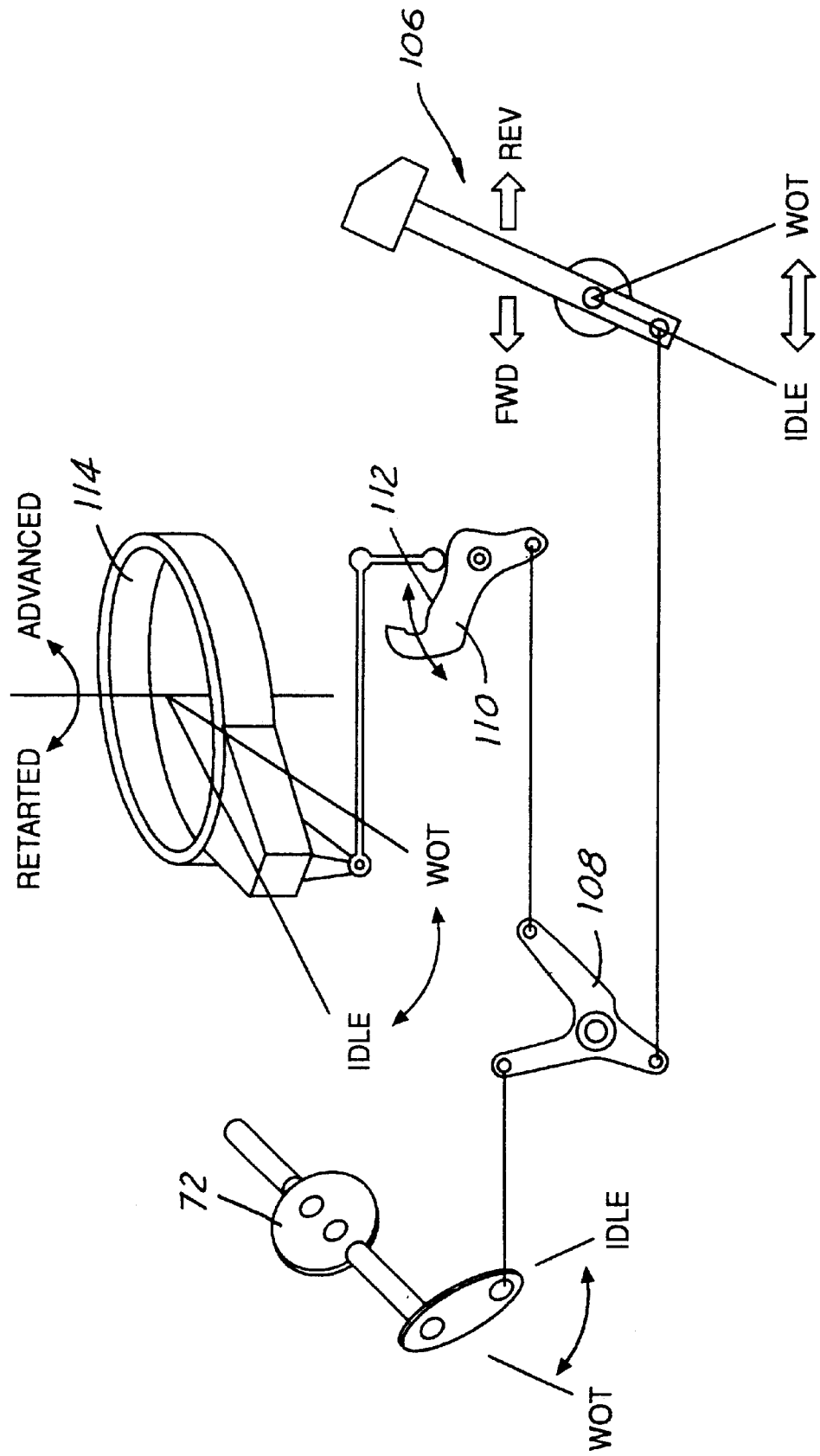
FIG. 7 is an exploded perspective view of a mechanical ignition timing control linkage.

After passing through BDC 39, as the piston 18 returns toward TDC 38, and after closing the intake port 50 (and usually transfer ports 46 and exhaust port 40), the skirt 41 of the piston 18 also opens the primary air intake port 54 to draw fresh air through the primary air mixing passage 60 of the charge forming device 12 after the combustion event. As the piston moves from TDC 38 toward BDC 39, the primary air intake port 54 is closed and the compressed air in the crankcase is transferred into the combustion chamber 34 through the passages 44 when the transfer ports 46 are opened by the piston Ignition Timing Referring to FIG. 3, an ignition timing and throttle opening graph, commonly known in the outboard marine engine industry, is shown. For marine applications, the ignition timing must vary significantly with small changes in throttle opening at low speeds under conventional propeller load and exhaust in the water conditions. This has typically been accomplished by throttle/ignition mechanical linkage mechanisms for outboard engines. One such linkage is shown in FIG. 7, wherein a throttle lever 106 pivots a tri-arm member or bell crank 108 which opens and closes the throttle valve 72 while simultaneously pivoting a cam arm 110. Cam arm 110 has a profiled surface 112 which is mechanically linked to an ignition stator 114, thereby rotating the stator to retard or advance ignition timing.

Another embodiment of such a linkage utilizes an ignition timing control system described in U.S. Provisional Patent Application, Ser. No. 60/306,381, and incorporated herein by reference. The ignition timing control system replaces the tri-arm member 108, cam arm 110, and stator 114 described above, and advances ignition timing by sensing engine RPM, throttle lever position and throttle valve position.

Understanding this, a significant advantage of the present invention is the ability to control idle speed through variable ignition timing synchronized with throttle valve 72 position. Controlling low speed conditions through retarded ignition timing allows for further simplification of the primary fuel circuit 16 and in many applications eliminates the need for the injector throttle valve 93 and related shafts, pivot arms and linkages 96 previously described Removal of the injector throttle valve 93 creates an unrestricted injector mixing passage 88 for increased air flow and signal (depression) through the injector venturi 86 at low speed engine conditions creating improved fuel-and-air mixing and better charge distribution to the engine 10 equipped with this fuel injection system. As the engine 10 speed rises, increased air flow in the injector mixing passage 88 provides a proportional increase in fuel delivery to the fuel injector feed tube 90, and ultimately the combustion chamber 34, to meet engine fuel demand. In the same manner, engine power and volumetric/thermal efficiency are increased as throttle position and ignition timing are advanced. This approach provides an improved method for achieving stable engine 10 operation at minimal load/speed conditions without requiring the primary air circuit 14 to also deliver small quantity of fuel proportional to engine 10 demand at idle and just off idle conditions and to provide a transition to the primary fuel circuit 16 as fuel demand further increases.

The retarded ignition at slow speeds provides several benefits for engine operation including:
  A) Additional time for fuel charge preparation and mixing in the cylinder 20 before combustion occurs,
  B) Smoother engine 10 idle characteristics derived from a lower mean effective pressure in the cylinder 20 due to the retarded combustion event,
  C) Improved engine 10 start ability and warm up,
  D) Decrease in combustion instability (misfire) or pre-ignition events induced by variation in exhaust back pressure/tuning effect at low speeds inherent with outboard marine engine design and installation angle on the boat transom (exhaust passage water column), and
  E) Decreased exhaust emissions.

Figure 4:
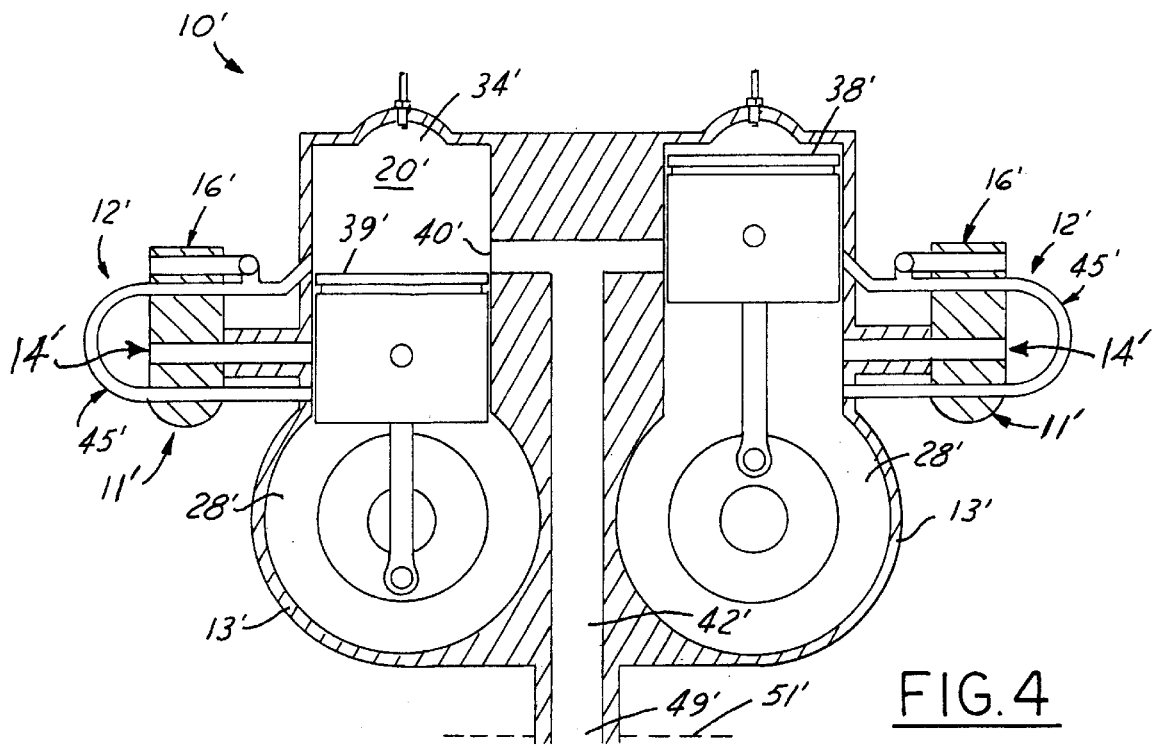
FIG. 4 is a cross section side view of a second embodiment of a two cycle combustion engine with a fuel injection system of the present invention.

As shown in FIG. 4, a second embodiment of the combustion engine 10' has multiple engine block sub-assemblies 13. Each sub-assembly 13 has its own discreet charge forming device 12' including the primary fuel circuit 16', primary air circuit 14', fuel chamber 11' and injector circuit 45'. Engine 10' however does share a common exhaust connecting pipe 42'. Each carburetor 12' is attached to a main throttle control linkage, or slaved to a master carburetor for synchronization of air flow settings (not shown). Although the throttle control linkage is more complex than a single carburetor application, engine 10' has the ability to separately calibrate the fuel and air mixture delivery for each particular engine cylinder 20' location.

Figure 5:
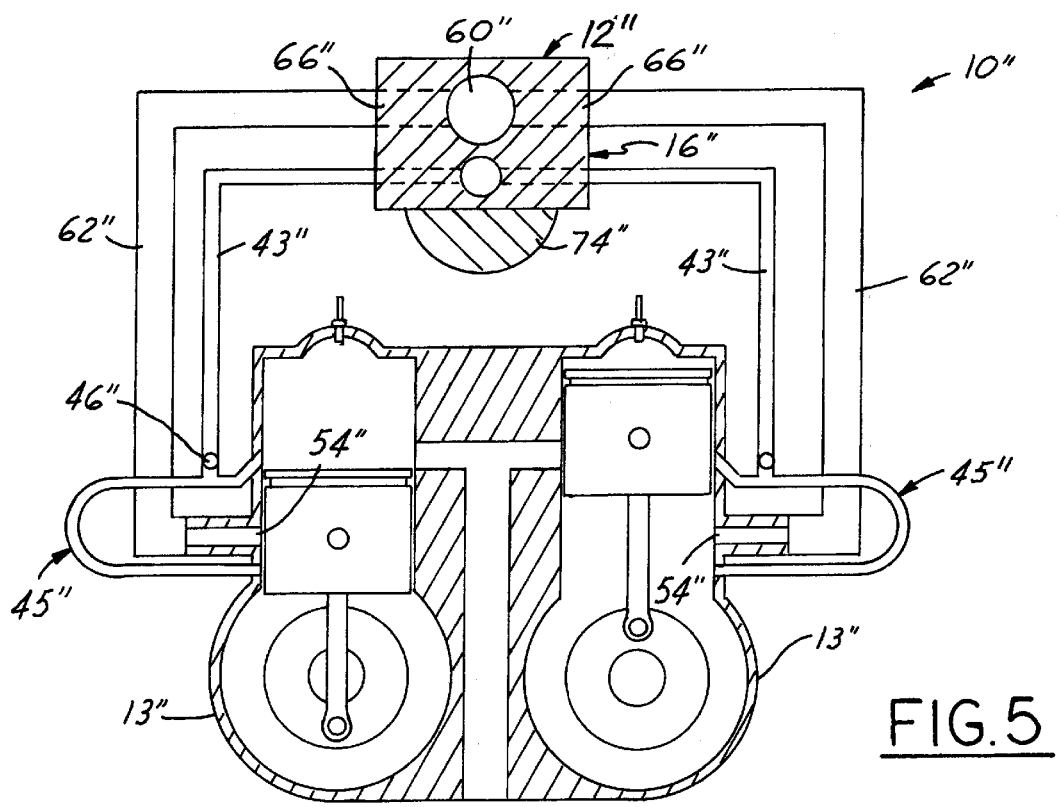
FIG. 5 is a semi schematic cross section side view of a third embodiment of a two cycle combustion engine with a fuel injection system of the present invention.

As shown in FIG. 5, a third embodiment of the engine 10" also has multiple engine block sub assemblies 13", multiple injector circuits 45", and multiple primary air feed pipes 62" as does the second embodiment. Unlike the second embodiment, the third embodiment utilizes a common charge forming device 12". The primary air feed pipe 62" communicate between the outlet 66" of the carburetor primary air mixing passage 60" and the primary air intake port 54" of each respective engine block sub assembly 13". Each one of the multiple injector circuits 45" supplies fuel to only a respective one of the multiple engine block sub-assemblies 13". Each one of the multiple injector feed tubes 43" of the multiple injector circuits 45" communicates with the common primary fuel circuit 16". The third embodiment has the advantage of a common throttle shaft or cable routed to the charge forming device 12", not shown, for simultaneous air flow control to each injector circuit 45". However, this approach may result in fuel-and-air mixture variation delivered to outlying engine block sub-assemblies 13" due to different lengths of injector feed tube 43" and primary air feed pipe 62" lengths and cylinder packaging differences.

Figure 6:
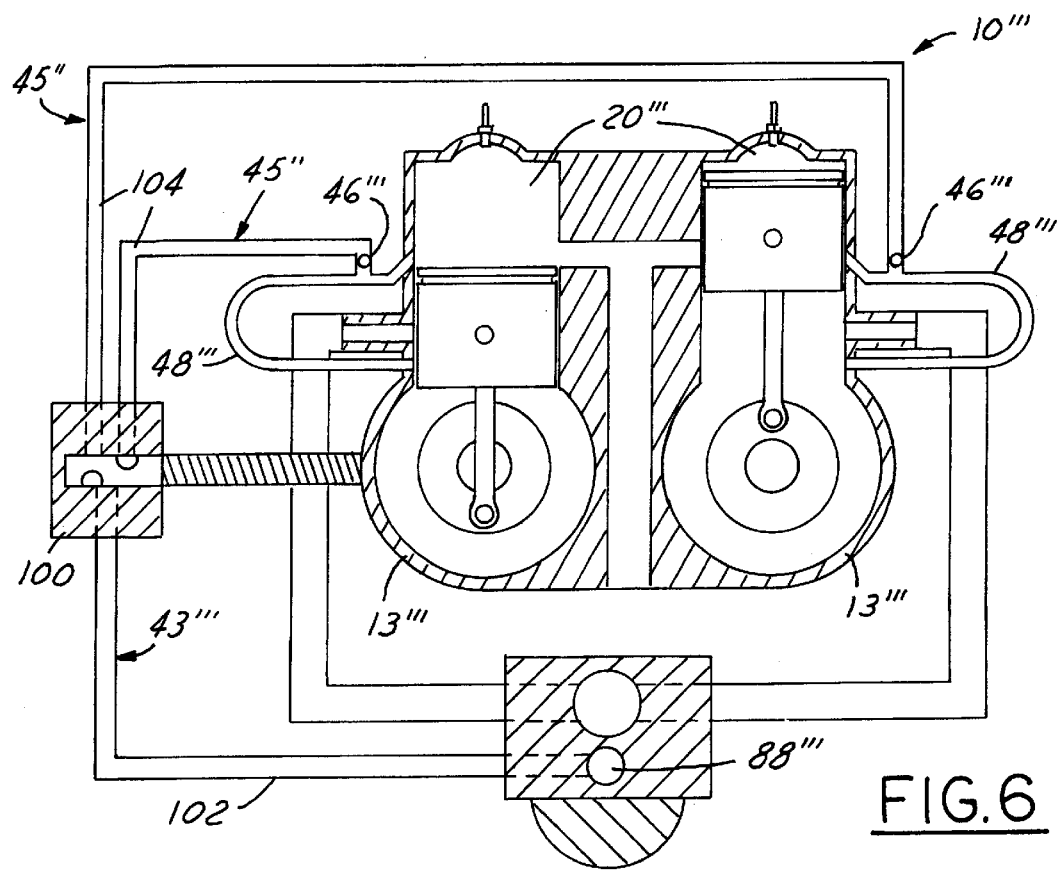
FIG. 6 is a semi schematic cross section side view of a fourth embodiment of a two cycle combustion engine with a fuel injection system of the present invention.

As shown in FIG. 6, a fourth embodiment of the combustion engine 10''' is similar to the third embodiment described above, except that the injector circuit 45" now incorporates a rotary valve distributor 100. The injector feed tube 43'" has a primary injector feed tube 102 which communicates between the injector mixing passage 88'" and the inlet of the rotary valve distributor 100. A series of secondary injector feed tubes 104 of the injector feed tube 43'" communicate between respective outlets of the rotary valve distributor 100 and the tuned injector tube 48'" of each respective engine block sub assembly 13'". Similar to the third embodiment, the secondary injector feed tubes 104 each contain a check valve 46'" positioned just prior to the tuned injector tube 48'".

The fuel-and-air charge exiting the distributor 100 is delivered via the secondary injector feed tubes 104 to the tuned injector tube 48'" installed on the particular engine block sub-assembly 13'" of the respective cylinder 20'". The fuel-and-air charge is subsequently delivered to the particular cylinder 20'" at the appropriate time and fuel delivery sequence. Although not shown, the rotary valve distributor 100 can be exchanged with an electronic switching valve used to control fuel delivery to each cylinder 20'" with the added complexity of a power source, an electronic controller, and applicable sensors.

While the forms of the invention herein disclosed constitute presently preferred embodiments, many others are possible. For instance, the float type carburetor can be replaced with a diaphragm type carburetor as disclosed within the copending application Ser. No. 09/764,701, but sized to handle the higher fuel demands of a two cycle marine combustion engine. It is not intended herein to mention all the equivalent forms or ramifications of the invention. It is understood that the terms used herein are merely descriptive, rather than limiting, and that various changes may be made without departing from the spirit or scope of the invention as defined by the following claims.

We claim:

1. A two-stroke, fuel injected, spark ignited, internal combustion engine comprising:
   a piston;
   an engine block subassembly defining a cylinder, a crankcase, and a transfer passage, the piston disposed for reciprocation within the cylinder, the cylinder communicating with the crankcase, the transfer passage communicating between the cylinder and the crankcase, the subassembly further defining an exhaust port communicating with the cylinder, a cylinder injector port communicating with the cylinder, a crankcase injector port communicating with the crankcase and constructed and arranged to communicate with the cylinder injector port, a primary air intake port communicating with the crankcase;
   a crankshaft engaged to and driven to rotate by the piston;
   a charge forming device having:
      a primary air circuit having a primary air mixing passage having an inlet communicating with atmosphere and an outlet constructed and arranged to communicate with the primary air intake pipe, a throttle valve disposed rotateably within the primary air mixing passage, and
      a primary fuel circuit having an injector mixing passage and a venturi disposed within the injector mixing passage; and
   an injector circuit having a tuned injector tube communicating adjacent one end with the primary air circuit and the cylinder injector port and adjacent to the other end with the crankcase injector port.

2. The combustion engine as set forth in claim 1 wherein the injector circuit has an injector feed tube engaged and communicating between the tuned injector tube and the outlet of the injector mixing passage, the injector feed tube having a check valve constructed and arranged to prevent flow from the tuned injector tube into the injector mixing passage.

3. The combustion engine as set forth in claim 2 wherein the charge forming device has an integral float-type fuel chamber, the primary air circuit having a fuel bleed screw for controlling fuel flow through the primary air mixing passage into the crankcase, and the primary fuel circuit having a fuel adjustment screw for controlling fuel flow through the injector mixing passage into the cylinder.

4. The combustion engine as set forth in claim 3 wherein the charge forming device has a body which supports the primary air and fuel circuits and the float-type fuel chamber.

5. The combustion engine as set forth in claim 3 comprising the primary fuel circuit having a choke valve disposed between the venturi and the inlet of the injector mixing passage, and the primary air circuit having a choke valve disposed between the venturi and the inlet of the air mixing passage, wherein the choke valve of the primary air circuit and the choke valve of the primary fuel circuit are inter-linked mechanically creating simultaneous restriction of airflow through the primary air mixing passage and the injector mixing passage.

6. The combustion engine as set forth in claim 5 further comprising:
   a throttle lever;
   a tri-arm member engaged between the throttle lever and the throttle valve of the primary air circuit;
   a cam arm engaged between the tri-arm member and an ignition stator, the cam arm having a profiled surface linked mechanically to the ignition stator for rotating the stator to retard or advance ignition timing.

7. The combustion engine as set forth in claim 6 comprising:
   a plurality of engine block subassemblies, the engine block subassembly being one of the plurality of engine block subassemblies; and
   a plurality of injector circuits, the injector circuit being one of the plurality of injector circuits, each one of the plurality of engine block subassemblies constructed and arranged with a respective one of the plurality of injector circuits.

8. The combustion engine as set forth in claim 7 comprising:
   a plurality of primary fuel circuits, the primary fuel circuits being one of the plurality of primary fuel circuits, each one of the plurality of engine block subassemblies constructed and arranged with a respective one of the plurality of injector assemblies; and
   a plurality of primary air circuits, the primary air circuits being one of the plurality of primary air circuits, each one of the plurality of engine block subassemblies constructed and arranged with a respective one of the plurality of primary air circuits.

9. The combustion engine set forth in claim 8 wherein an upper edge of the cylinder exhaust port is closer to top dead center of the cylinder than an upper edge of the injector port.

10. The combustion engine as set forth in claim 9 comprising an injector throttle valve of the primary fuel circuit disposed within the injector mixing passage between the injector venturi and the outlet of the injector mixing passage.

11. The combustion engine as set forth in claim 7 comprising a plurality of primary air feed pipes each one constructed and arranged to communicate between the outlet of the primary air mixing passage and the primary air intake port of each respective one of the plurality of engine block subassemblies, the plurality of engine block subassemblies sharing the common charge forming device.

12. The combustion engine as set forth in claim 11 comprising a plurality of injector feed tubes constructed and arranged to merge and communicate with the outlet of the injector mixing passage, the injector feed tube being one of the plurality of injector feed tubes, each one of the plurality of injector feed tubes communicating with the tuned injector tube of a respective one of the plurality of injector circuits.

13. The combustion engine as set forth in claim 12 wherein an upper edge of the cylinder exhaust port is closer to top dead center of the cylinder than an upper edge of the injector port.

14. The combustion engine as set forth in claim 13 comprising an injector throttle valve of the primary fuel circuit disposed within the injector mixing passage between the injector venturi and the outlet of the injector mixing passage.

15. The combustion engine as set forth in claim 11 comprising:
  the charge forming device having a primary injector feed tube and a distributor, the primary injector feed tube communicating between the outlet of the injector mixing passage and the distributor; and
  the injector feed tube of each one of the plurality of injector circuits being a secondary injector feed tube communicating between the common distributor and the respective tuned injector tube.

16. The combustion engine as set forth in claim 15 wherein the distributor is a rotary valve distributor driven mechanically by the combustion engine.

17. The combustion engine as set forth in claim 15 wherein an upper edge of the cylinder exhaust port is closer to a top dead center of the cylinder than an upper edge of the injector port.

18. The combustion engine as set forth in claim 17 comprising an injector throttle valve of the primary fuel circuit disposed within the injector mixing passage between the injector venturi and the outlet of the injector mixing passage.

19. A charge forming device for a two stroke engine having a piston and an engine block subassembly defining a cylinder, a crankcase, and a transfer passage, the piston disposed for reciprocation within the cylinder, the cylinder communicating with the crankcase, the transfer passage communicating between the cylinder and the crankcase, the subassembly further defining an exhaust port communicating with the cylinder, a cylinder injector port communicating with the cylinder, a crankcase injector port communicating with the crankcase and constructed and arranged to communicate with the cylinder injector port, a primary air intake port communicating with the crankcase, a crankshaft engaged to and driven to rotate by the piston, the charge forming device comprising:
  a primary air circuit having a primary air mixing passage having an inlet communicating with atmosphere and an outlet constructed and arranged to communicate with the primary air mixing passage, a choke valve disposed rotateably within the primary air mixing passage, a throttle valve disposed rotateably within the primary air mixing passage between the choke valve and the outlet of the primary air mixing passage, a venturi disposed within the air mixing passage between the choke and throttle valves;
  a primary fuel circuit having an injector mixing passage, an injector venturi disposed within the injector mixing passage, a choke valve disposed rotateably within the injector bore; and
  an injector circuit having a tuned injector tube communicating between the cylinder injector port and the crankcase injector port, and an injector feed tube engaged and communicating between the tuned injector tube substantially near the injector cylinder intake port and an outlet of the injector mixing passage, the injector venturi disposed between the injector choke valve and the outlet, the injector feed tube having a check valve to prevent flow from the tuned injector tube into the injector mixing passage.

20. The charge forming device as set forth in claim 19 further comprising:
  a body; and
  a fuel supply device having a fuel inlet, a control valve, a lever arm, and a bowl defining a fuel chamber, the bowl engaged to and below the body, the lever arm engaged between the float and the control valve, wherein the float rises with increasing fuel level within the chamber until the control valve closes the fuel inlet.

21. The charge forming device as set forth in claim 20 further comprising a fuel bleed screw adjustably traversing a passage first leg which communicates between the primary air mixing passage and the fuel chamber.

22. The charge forming device as set forth in claim 21 further comprising a fuel adjustment screw adjustably traversing a passage second leg which communicates between the injector mixing passage and the fuel chamber.

23. The charge forming device as set forth in claim 22 comprising a body which supports the primary air and fuel circuits and the float-type fuel chamber.

24. The charge forming device as set forth in claim 23 wherein the choke valve of the primary air circuit and the choke valve of the primary fuel circuit are inter-linked pivotally by an armature providing simultaneous restriction of airflow through the primary air mixing passage and the injector mixing passage.

25. The charge forming device as set forth in claim 24 comprising an injector throttle valve of the primary fuel circuit disposed within the injector mixing passage between the injector venturi and an outlet of the injector mixing passage.

26. A two-stroke, fuel injected, spark ignited, internal combustion engine comprising:
  a piston;
  an engine block subassembly defining a cylinder, a crankcase, and a transfer passage, the piston disposed for reciprocation within the cylinder, the cylinder communicating with the crankcase, the transfer passage communicating between the cylinder and the crankcase, the subassembly further defining an exhaust port communicating with the cylinder, a cylinder injector port communicating with the cylinder, a crankcase injector port communicating with the crankcase and constructed and arranged to communicate with the cylinder injector port, a primary air intake port communicating with the crankcase;
  a crankshaft connected to and driven to rotate by the piston;

a charge forming device having:

a primary air circuit having a primary air mixing passage having an inlet communicating with atmosphere and an outlet constructed and arranged to communicate with the primary air intake pipe, a throttle valve disposed rotatably within the primary air mixing passage, and a primary fuel circuit having a venturi, and an injector mixing passage having an inlet communicating with atmosphere and an outlet, the venturi disposed within the injector mixing passage; and an injector circuit having a tuned injector tube communicating adjacent one end with the primary air circuit and the cylinder injector port and adjacent to the other end with the crankcase injector port.

27. The combustion engine as set forth in claim 26 further comprising:

a throttle lever;

a tri-arm member engaged between the throttle lever and the throttle valve of the primary air circuit; and a cam arm engaged between the tri-arm member and an ignition stator, the cam arm having a profiled surface linked mechanically to the ignition stator for rotating the stator to retard or advance ignition timing.

28. The combustion engine as set forth in claim 26 further comprising:

a throttle lever; and an ignition timing control system constructed and arranged to communicate between the throttle lever and the throttle valve of the primary air circuit.

* * * * *